United States Patent
Potoček et al.

(10) Patent No.: US 10,481,378 B2
(45) Date of Patent: Nov. 19, 2019

(54) INTERACTIVE GRAPHICAL REPRESENTATION OF IMAGE QUALITY AND CONTROL THEREOF

(71) Applicant: FEI Company, Hillsboro, OR (US)

(72) Inventors: Pavel Potoček, Eindhoven (NL); Remco Schoenmakers, Best (NL)

(73) Assignee: FEI Company, Hillsboro, OR (US)

(*) Notice: Subject to any disclaimer, the term of this patent is extended or adjusted under 35 U.S.C. 154(b) by 0 days.

(21) Appl. No.: 15/232,760

(22) Filed: Aug. 9, 2016

(65) Prior Publication Data
US 2017/0131536 A1   May 11, 2017

(30) Foreign Application Priority Data

Nov. 10, 2015 (EP) ..................... 15193784

(51) Int. Cl.
| | |
|---|---|
| *G02B 21/36* | (2006.01) |
| *G06T 7/00* | (2017.01) |
| *G06T 11/20* | (2006.01) |
| *H04N 17/00* | (2006.01) |

(52) U.S. Cl.
CPC ......... *G02B 21/365* (2013.01); *G02B 21/368* (2013.01); *G06T 7/0002* (2013.01); *G06T 11/206* (2013.01); *H04N 17/002* (2013.01); *G06T 2207/10056* (2013.01); *G06T 2207/30168* (2013.01)

(58) Field of Classification Search
None
See application file for complete search history.

(56) References Cited

U.S. PATENT DOCUMENTS

| | | | |
|---|---|---|---|
| 2003/0187603 A1 | 10/2003 | Bachmann | |
| 2005/0072920 A1* | 4/2005 | Inada | G01N 23/04 250/311 |
| 2005/0219362 A1* | 10/2005 | Garoutte | H04N 17/00 348/180 |

(Continued)

FOREIGN PATENT DOCUMENTS

EP   0977431 A2   2/2000

OTHER PUBLICATIONS

Extended European Search Report in European Application No. 15193784.4, dated Feb. 19, 2016.

*Primary Examiner* — Frederick D Bailey

(74) *Attorney, Agent, or Firm* — Klarquist Sparkman, LLP

(57) ABSTRACT

Systems and methods for controlling an imaging device are disclosed. In one aspect, a method determines a set of control parameters for the imaging device, and acquires an image based on the set of control parameters. The method determines a plurality of image quality measurements of the first image. A polygon may be displayed on an electronic display based on a plurality of image quality measurements. For example, positions of polygon vertices may be determined relative to an origin point based on corresponding image quality measurements. In some aspects, input may be received from a user interface indicating a change in position of one or more of the vertices and the corresponding image quality measurements. In some aspects, a new set of control parameters may then be determined to achieve the changed image quality measurement(s). In some aspects a composite measure of the image quality measurements may also be displayed.

29 Claims, 7 Drawing Sheets

(56) References Cited

U.S. PATENT DOCUMENTS

| | | | |
|---|---|---|---|
| 2009/0094053 A1 | 4/2009 | Jung et al. | |
| 2010/0086189 A1* | 4/2010 | Wang | G06T 5/00 |
| | | | 382/132 |
| 2011/0081088 A1* | 4/2011 | Xiao | G06K 9/00664 |
| | | | 382/218 |
| 2011/0085057 A1* | 4/2011 | Takahashi | H04N 5/232 |
| | | | 348/231.3 |
| 2014/0092122 A1* | 4/2014 | Sano | G09G 5/02 |
| | | | 345/601 |
| 2016/0042249 A1* | 2/2016 | Babenko | G06K 9/00744 |
| | | | 382/170 |
| 2016/0247034 A1* | 8/2016 | Lee | G06K 9/036 |
| 2017/0213355 A1* | 7/2017 | Hujsak | G06T 5/005 |
| 2017/0310866 A1* | 10/2017 | Zhou | H04N 5/235 |

* cited by examiner

INTERACTIVE GRAPHICAL REPRESENTATION OF IMAGE QUALITY AND CONTROL THEREOF

CROSS REFERENCE TO RELATED APPLICATIONS

This application claims priority to European Patent Application No. EP15193784.4, filed Nov. 10, 2015 and entitled "SYSTEMS AND METHODS FOR IMAGING DEVICE INTERFACES." The content of this prior application is considered part of this application, and is hereby incorporated by reference in its entirety.

BACKGROUND

Field

The disclosed technology relates generally to electronic interfaces for imaging devices.

Description of the Related Technology

Microscopes acquire focused and magnified images of samples. A quality level of an image acquired by the microscope may depend on control settings for individual components of the microscope, which may include one or more sensors, optics, a stage, and in some aspects, an illuminator. The control settings may include one or more of a light level, sample position, sample orientation, magnification, focal plane position relative to the sample and sensor, aperture, dwell time, and shutter speed. For example, changes in a focal plane position or a sample position may improve focus. Increasing dwell time can reduce noise in an image in some configurations.

Changes in a particular control setting may affect the optimal setting for another control setting. For example, changing the focal plane of the microscope may improve focus, but may be accompanied by changes in a level of illumination to achieve the optimal image.

SUMMARY OF CERTAIN INVENTIVE ASPECTS

A summary of sample aspects of the disclosure follows. For convenience, one or more aspects of the disclosure may be referred to herein simply as "some aspects."

Methods and apparatuses or devices being disclosed herein each have several aspects, no single one of which is solely responsible for its desirable attributes. Without limiting the scope of this disclosure, for example, as expressed by the claims which follow, its more prominent features will now be discussed briefly. After considering this discussion, and particularly after reading the section entitled "Detailed Description" one will understand how the features being described provide advantages that include controlling an imaging device, such as a microscope, with composite and individual image quality measurements.

As discussed above, controlling an imaging device to acquire high quality images may include controlling multiple aspects of an imaging device's sensor, optics, stage, and/or illuminator. Some control settings, such as focal plane position, may be tunable, while others, such as optical distortion, may not be. While some solutions rely on visual inspection of an image with regard to each of these aspects, followed by an adjustment to the respective control settings, and further iterations until an image meets certain quality criteria, this approach may be subjective, inconsistent, and inefficient. Semi-automatic or automatic systems and methods, such as autofocus or automatic white balance may help, but existing approaches tend to optimize individual image quality measurements.

Thus, there is a need for systems and methods that quantify multiple image quality factors, determine an overall or composite quality measure, and display the composite measure and the individual factors to a user. Such systems and methods enable a user to characterize overall image quality as well as for the user to assess contributions of individual qualitative factors for image acquisition. The quantification of the multiple image quality factors can also be used to control the imaging device, either manually, semi-automatically, or automatically. Such systems and methods could be applied to a wide range of microscopes, telescopes, medical devices, and cameras.

Some aspects of the disclosed systems and methods provide a graphical display that allows a microscopy (or other imaging device) user to more readily grasp the many interrelated parameters controlling image acquisition in an image acquisition environment. These interrelated parameters combine to produce a resulting image. In some aspects, an overall or composite image quality metric is determined. The composite measure serves to summarize image quality resulting from a current set of parameters. In some further embodiments, at least a portion of the image quality parameters contributing to the composite measure are also displayed graphically on a computer user interface, along with the composite or image quality metric.

In some aspects, an "Image Quality Star" is displayed on the computer user interface. In some aspects, each corner of the star represents an individual parameter contributing to the composite measure. A distance from the center of the star to a corner may be proportional to the setting of the individual parameter. In some aspects, a particular parameter can be adjusted by "dragging" the corresponding corner of the "image quality star" to a new position on the graphical user interface. Adjustment of a first parameter may have effects on one or more other image acquisition parameters. Thus, in some aspects, adjustment of the first parameter via the "image quality star" interface may also cause the display and setting of other parameters within the "image quality star" to also be adjusted.

One aspect disclosed herein is a method of controlling an imaging device. In various embodiments, the method may include determining a set of control parameters for the imaging device. The method may further include acquiring an image from the imaging device based on the set of control parameters. The method may further include determining, by a processor circuit, a plurality of image quality measurements of the image. The method may further include displaying a polygon on an electronic display based on the plurality of image quality measurements.

For some implementations, the method further includes determining, by the processor circuit, a composite measure of the image based on the plurality of image quality measurements. For some implementations, the method further includes displaying, on the electronic display, the composite measure.

For some implementations, displaying the polygon includes determining an origin point for the polygon. For some implementations, displaying the polygon includes determining a plurality of vertices corresponding to the plurality of image quality measurements, each vertex a distance from the origin point proportional to a value of its corresponding image quality measurement. For some implementations, displaying the polygon includes displaying the polygon as a plurality of lines, each line connecting two of the plurality of vertices.

For some implementations, determining the plurality of image quality measurements includes determining at least one of a mean intensity value, a histogram variance value, a histogram symmetry value, a clipping value, a sharpness value, a signal to noise ratio, and a stigmation value. For some implementations, the set of control parameters includes at least one of a sample position, a sample orientation, a focal plane position, an optics magnification, an optics pointing angle, an illumination intensity, a shutter speed, a stigmator coil current, a time for taking an image, an aperture opening, a shutter speed, and a dwell time.

For some implementations, the composite measure comprises a number based on a mathematical composition or a product of the plurality of image quality measurements. For some implementations, determining the composite measure comprises determining a weighted linear combination of the plurality of image quality measurements.

For some implementations, the method further includes displaying one or more values of image quality measurements along corresponding axes between the origin point and corresponding vertices. For some implementations, the method further includes normalizing values of one or more of the plurality of image quality measurements between common first and second values. For some implementations, displaying the one or more values along the corresponding axes comprises displaying the normalized values. For some implementations, the method further includes determining a color based on the composite measure. For some implementations, the method further includes displaying at least a portion of the polygon based on the determined color.

For some implementations, the method further includes receiving an input via an input device, the input defining a change to at least one of the image quality measurements. For some implementations, the method further includes updating the polygon based on the input.

For some implementations, the method further includes determining, via the processing circuit, an updated set of control parameters for the imaging device based on the input. For some implementations, the method further includes setting a control parameter of the imaging device based on at least a portion of the updated set of control parameters. For some implementations, the control parameters are set electronically and/or manually.

For some implementations, determining the updated set of control parameters comprises determining a change in at least one of a focal plane position, a sample position, or a sample orientation in response to a change in the sharpness value. For some implementations, determining the updated set of control parameters comprises determining a change in at least one of an aperture opening, an illumination intensity level, or a shutter speed, in response to a change in a mean intensity value or a clipping value. For some implementations, determining the updated set of control parameters comprises determining a change in a stigmator coil current in response to a change in a stigmation value. For some implementations, determining the updated set of control parameters comprises determining a change in a dwell time in response to a change in a signal to noise ratio.

For some implementations, the method further includes iteratively performing the method based on the updated set of control parameters.

For some implementations, the method further includes receiving an input defining a change in a length of one of the axes between the origin point and the corresponding one of the vertices. For some implementations, the method further includes updating an image quality measurement corresponding to the axis based on the changed length of the axis.

Another aspect is an apparatus for controlling an imaging device. The apparatus may include a sensor configured to acquire an image from the imaging device based on a set of control parameters. The apparatus may include a processor circuit. The processor circuit may be configured to determine a plurality of image quality measurements of the image. The processor circuit may be further configured to determine a composite measure of the image based on the plurality of image quality measurements. The processor circuit may be further configured to display a polygon on an electronic display based on the plurality of image quality measurements.

For some implementations, the processor circuit may be further configured to determine a composite measure of the image based on the plurality of image quality measurements. For some implementations, the processor circuit may be further configured to display the composite measure on the electronic display.

For some implementations, the processor circuit may be further configured to determine an origin point for the polygon. The processor circuit may be further configured to determine a plurality of vertices corresponding to the plurality of image quality measurements, each vertex a distance from the origin point proportional to a value of the corresponding image quality measurement. The processor circuit may be further configured to display the polygon as a plurality of lines, each line connecting two of the plurality of vertices.

For some implementations, the processor circuit is further configured to display one or more values of image quality measurements along corresponding axes between the origin and corresponding vertices. For some implementations, the processing circuit is further configured to normalize the one or more values of the image quality measurements. For some implementations, the processing circuit is further configured to display the normalized values.

For some implementations, the processor circuit is further configured to determine a color based on the composite measure. For some implementations, the processing circuit is further configured to display at least a portion of the polygon based on the determined color.

For some implementations, the apparatus includes an input device configured to receive an input that defines a change in one or more of the plurality of image quality measurements. For some implementations, the input device includes a touch device, a mouse, a keyboard, a knob, a joystick, and/or a voice control. For some implementations, the processor circuit is further configured to determine an updated set of control parameters for the imaging device based on the input.

For some implementations, the apparatus includes a microscope, a charged particle optical instrument, a photon optical instrument, a single beam scanning electron microscope, a dual beam scanning electron microscope, a multi-beam scanning electron microscope, a focused ion beam microscope, a transmission electron microscope, an optical microscope, a telescope, a medical imaging device, a digital camera, or a video camera.

Another aspect is an apparatus for controlling an imaging device. The apparatus includes means for determining a set of control parameters for the imaging device. The apparatus includes means for acquiring an image from the imaging device based on a set of control parameters. The apparatus includes means for determining a plurality of image quality measurements of the image. The apparatus includes means for displaying a polygon on an electronic display based on the plurality of image quality measurements. In some aspects, the apparatus includes means for determining a composite measure of the image based on the plurality of image quality measurements. In some aspects, the apparatus includes means for displaying the composite measure on the electronic display. In some aspects, displaying the polygon comprises determining an origin point for a polygon and a plurality of vertices corresponding to the plurality of image quality measurements, each vertex a distance from the origin point proportional to a value of the corresponding image quality measurement. In these aspects, the apparatus may include means for displaying the polygon as a plurality of lines, each line connecting two of the plurality of vertices.

For some implementations, the acquiring means includes a sensor. For some implementations, the image quality measurements determining means includes a processor circuit. For some implementations, the composite measure determining means includes the processor circuit. For some implementations, the display composite measure means comprises an electronic display. For some implementations, the origin point and vertex determining means comprises the processor circuit. For some implementations, the polygon displaying means comprises the electronic display.

Another aspect is a non-transitory computer-readable storage medium having stored thereon instructions that, when executed, cause a processor of a device to determine a set of control parameters for an imaging device. When executed, the instructions further cause the processor of the device to acquire an image from the imaging device based on the set of control parameters. When executed, the instructions further cause the processor of the device to determine a plurality of image quality measurements of the image. When executed, the instructions further cause the processor of the device to display a polygon on an electronic display based on the plurality of image quality measurements. In some aspects, when executed, the instructions further cause the processor of the device to determine a composite measure of the image based on the plurality of image quality measurements. In some aspects, when executed, the instructions further cause the processor of the device to display the composite measure on the electronic display. In some aspects, displaying the polygon comprises determining an origin point for a polygon, determining a plurality of vertices corresponding the plurality of image quality measurements, each vertex a distance from the origin point proportional to a value of the corresponding image quality measurements, and displaying the polygon as a plurality of lines, each line connecting two of the plurality of vertices.

BRIEF DESCRIPTION OF THE DRAWINGS

The above-mentioned aspects, as well as other features, aspects, and advantages of the present technology will now be described in connection with various implementations, with reference to the accompanying drawings. The illustrated implementations, however, are merely examples and are not intended to be limiting. Throughout the drawings, similar symbols typically identify similar components, unless context dictates otherwise. Note that the relative dimensions of the following figures may not be drawn to scale.

DETAILED DESCRIPTION OF CERTAIN EMBODIMENTS

The following detailed description is directed to certain specific embodiments of the invention. However, the invention can be embodied in a multitude of different ways. It should be apparent that the aspects herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

The disclosed technology relates to systems and methods for controlling the quality of a captured image. The images may be acquired by charged particle optical instruments or photon optical instruments, such as scanning electron microscopes (single beam, dual beam, or multi-beam), focused ion beam microscopes, and transmission electron microscopes. The disclosed technology also applies to optical microscopes, telescopes, digital cameras, video cameras or any other digital image capture device.

Figure 1:
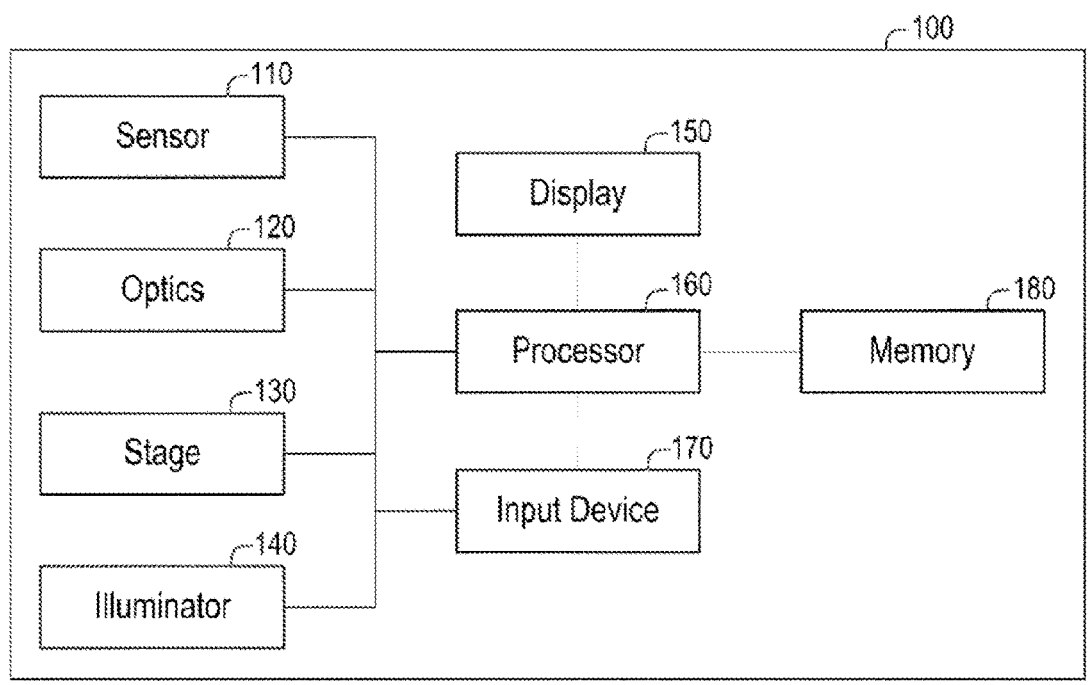
FIG. 1 is a block diagram of the microscopy system that may be configured to implement one or more aspects of the disclosure.

FIG. 1 is an illustration of a microscopy system 100 that may be configured to implement one or more aspects of this disclosure. The microscopy system 100 of FIG. 1 shows an electronically controllable microscope that includes input devices 170 and an electronic display 150. However, as discussed above, embodiments are not limited to only microscopy systems.

FIG. 1 is an expanded block diagram of an electronically controllable microscopy system 100 that acquires focused and magnified images of positioned and illuminated samples. The microscopy system 100 includes a processor circuit 160, which is electronically coupled to a memory circuit 180, a display 150, and an input device 170. The processor circuit 160 is electronically coupled to a sensor 110. The processor circuit 160 may be electronically coupled to optics 120, a stage 130, and/or an illuminator 140. An input device 170 may be electronically coupled to the sensor 110, the optics 120, the stage 130, the illuminator 140, and/or the processor circuit 160. Electronic coupling between components allows the coupled components to electronically communicate signals between themselves. This may be performed in various aspects via physical electronic connections, or a wireless connection.

Stage 130 is a platform that holds and positions a sample being imaged by microscopy system 100. Stage 130 may hold the sample using a clip, indentation, or other mechanical device to keep the sample in place. Stage 130 may include actuators or gears to move the sample up, down, laterally, or at an angle relative to optics 120 and sensor 110. Such movement makes it possible to change the position of the sample relative to a focal plane in optics 120, thereby bringing the sample into and out of focus. Input device 170 may include a knob, joystick, trackball, touchscreen, voice controller, or other device to move stage 130. The processor circuit 160 may send control signals to stage 130 to adjust the control parameters of sample position and orientation, based on, for example, an autofocus algorithm. While stage 130 is included in many microscopes that, for example, acquire images of biological samples, stage 130 is not included when capturing images of distant objects by telescopes.

Illuminator 140 illuminates the sample on stage 130 using a light source. For some implementations, illuminator 140 illuminates a sample from above, and light is reflected off of the sample. For some implementations, illuminator 140 shines light through an opening in stage 130 and through a sample, such as a microscope slide. Illuminator 140 may be used in addition to, or instead of, ambient illumination. An intensity of illumination may be adjusted based on input from input device 170 or control signals from processor circuit 160. For example, input device 170 may include a switch, knob, joystick, trackball, touchscreen, voice controller, or other device to adjust illumination. The processor circuit 160 may send control signals to illuminator 140 to adjust illumination intensity control parameters, to, for example, reduce overexposure or underexposure of an image.

Optics 120 magnifies and focuses light from an illuminated sample using one or more lenses. Optics 120 may include one or more lenses, with an adjustably positioned focal plane location relative to sensor 110. Input device 170 may include a knob, joystick, trackball, touchscreen, voice controller, or other device enabling a user to input a change in focal plane position, magnification, or pointing angle of optics 120. The processor circuit 160 may send control signals to optics 120 to adjust control parameters including focal plane position, magnification, or pointing angle of optics 120, based on, for example, the output of an autofocus program.

Sensor 110 acquires or captures, images with an array of sensors that captures rows and columns of picture elements (pixels) of a scene. The images captured by sensor 110 may be monochrome, color, multispectral, or hyperspectral. Sensor 110 may include one or more filters to acquire images of different wavelengths. For example a Bayer filter pattern may be used to capture color images. Sensor 110 may receive control signals from processor circuit 160 indicating when to capture one or more images, as well as image capture parameters, such as dwell time, shutter speed, aperture opening, and/or image resolution. These control signals may be determined by processor circuit 160 based on the result of user input to reduce noise, and an algorithm that converts the reduction in noise to an increase in dwell time. Input device 170 may include a knob, joystick, trackball, touchscreen, voice controller or other device enabling a user to adjust a sensor control setting, such as the timing for taking an image, an aperture opening, or a dwell time.

In some aspects, the microcopy system 100 may include additional hardware components not shown in FIG. 1. These additional hardware components may also influence quality of an image captured by the microscopy system 100.

Processor circuit 160 may include one or more processors, control circuits, graphics processing units, general purpose processors, or special purpose processors. Processor circuit 160 sends controls signals to sensor 110, optics 120, stage 130, and/or illuminator 140 to adjust control settings for each of these components of microscopy system 100. Processor circuit 160 receives images acquired by sensor 110. Processor circuit 160 stores images in memory circuit 180 and receives images, or portions of images, from memory circuit 180. Processor circuit 160 displays images on display 150.

Processor circuit 160 processes images acquired by sensor 110 to determine image quality measurements and composite measures. Example image quality measurements determined by processor circuit 160 may include sharpness, mean intensity, histogram variance, histogram symmetry, clipping, signal to noise ratio, or a stigmatic value. These image quality measurements are examples of image quality measurements that may or may not apply to a particular imaging instrument, application, or use case.

Sharpness characterizes whether an image is in focus. As an image comes into focus, high spatial frequency content increases and edges become more apparent. Therefore, processor circuit 160 may measure a sharpness image quality measurement by quantifying high frequency spatial content or the presence of edges in an image after applying an edge operator to the image. For transmission electron microscopes, processor circuit 160 may measure sharpness using either Fourier analysis or a beam-tilt method as focusing is applied.

Processor circuit 160 may measure a mean intensity image quality measurement by computing the average intensity value for the image. When the mean is lower than a minimum mean intensity threshold, the brightness may be increased by increasing an aperture of an optical system, decreasing shutter speed, or increasing dwell time. When the mean is higher than a maximum mean intensity threshold, the brightness may be decreased by decreasing an aperture of an optical system, increasing shutter speed, or decreasing dwell time.

Histogram variance is the variance of the intensity values for the image. Processor circuit 160 may measure a histogram variance image quality measurement by determining a "width" of the histogram, which corresponds to the overall image contrast. In an embodiment, processor circuit 160 estimates the width of a histogram by the difference in intensity between the brightest pixel and the darkest pixel. In an embodiment, processor circuit 160 estimates the width of a histogram by the difference in intensity between the remaining brightest pixel and the remaining darkest pixel after discarding, for example the 5% of pixels that are darkest and the 5% of pixels that are brightest. In an embodiment, processor circuit 160 estimates the width of the histogram by determining the difference between the brightest histogram value with more than a threshold number of pixels, and the darkest histogram value with more than the threshold number of pixels. When the variance is below a minimum histogram variance, processor circuit 160 may transmit control signals to increase contrast. When the variance is above a maximum histogram variance, processor circuit 160 may transmit control signals to decrease contrast.

Histogram symmetry may be characterized by a degree of asymmetry of the histogram shape to the left of the mean value with respect to the right of the mean value. When the left and right sides of a histogram have the same shape, the histogram is symmetric. Processor circuit 160 may measure an asymmetry image quality measurement by a variety of measures known to those with skill in the art, including mode skewness (Pearson's first skewness coefficient), median skewness (Pearson's second skewness coefficient), and quantile based measures.

Processor circuit 160 may measure a clipping image quality measurement based on the number of pixels at either the minimum or maximum intensity of an image. An underexposed image may have many pixels with 0 intensity value. An overexposed image may have many pixels at the top of the intensity range (for example, 255 for an 8-bit intensity value). In an embodiment, a clipping measure of 1 may correspond to none of the pixels having an intensity value at either the top or bottom of the intensity range, and a clipping measure of 0 may correspond to all of the pixels have an intensity value at either the top or bottom of the range. Contrast and brightness may be adjusted to compensate for clipping.

Processor circuit 160 may characterize a signal to noise ratio image quality measurement based on spatial noise (such as spurious dots) in an image. Increasing dwell time or applying a low pass filter to average sensed values may increase the signal to noise ratio of a captured image. For zero-loss filtered transmission electron microscopy, the width of the slit of the zero loss filter can be adjusted.

An optical system is stigmatic when light rays from a single point converge in a single focal point. Processor circuit 160 may measure a stigmation value image quality measurement based on asymmetry of an optical transfer function of the optical system. In an embodiment, a stigmation value of 100% may correspond to stigmatic, while a stigmation value of 0 corresponds to highly astigmatic. In a charged particle system the stigmation value can be influenced by adjusting currents in stigmator coils. Optical distortion as measured by the degree of astigmatism is a prime tunable parameter of a charged particle microscope, but is minimized when designing the optics for a telescope. Therefore, processor circuit 160 may measure a stigmation value image quality measurement for a scanning electron microscope, but not a telescope.

Processor circuit 160 may send a control signal to sensor 110, optics 120, stage 130, or illuminator 140 to adjust a control setting that will result in a higher quality image. For example, sharpness may be improved if sensor 110 adjusts a focal plane relative to sensor 110. The dynamic range, degree of clipping, or degree of saturation may be adjusted by adjusting an analog or digital gain in sensor 110. Noise of an image acquired by a scanning electron microscope may be reduced by increasing dwell time when acquiring an image by sensor 110. Other examples are included in the description of individual image quality measurements, above, with respect to FIG. 1.

Processor circuit 160 measures composite image quality measures of total image quality by combining the set of individual n image quality measurements into single composite number.

In an embodiment, processor circuit 160 normalizes image quality measurements normalization functions $f_i$ to map each $Q_i$ to a value between 0 and 100%, (1) so that, 100% (1) corresponds to precisely in focus, no detectable noise, and a lack of detectable stigmatism, while lower values correspond to defocused, detectable noise, and a degree of stigmatism. Normalization makes it possible for processor circuit 160 to combine image quality measurements into an overall composite measure of image quality. Processor circuit 160 may determine a composite image measure of total image quality $TIQ_p$ based on a mathematical composition or a product, such as the calculation of equation (1).

$$TIQ_p = 100\% * \Pi_{i=1}^{n} f_i(Q_i) \qquad (1)$$

In an embodiment, processor circuit 160 weights image quality measurements with weights $w_i$ and linearly combines the weighted image quality measurements to compute total image quality $TIQ_s$ according to equation (2):

$$TIQ_s = \Sigma_{i=1}^{n} w_i Q_i \qquad (2)$$

Processor circuit 160 receives inputs from input device 170 via knobs, joysticks, trackballs, touchscreens, voice controllers, or other devices. Such inputs may include requested changes to an image quality measurement. Processor circuit 160 converts requested changes to an image quality measurement to a change in control parameters of the sensor 110, optics 120, stage 130, and/or illuminator 140, and transmits control signals based on the change in control parameters. Processor circuit 160 computes automatic algorithms to control sensor 110, optics 120, stage 130, and/or illuminator 140. Such algorithms may include automatic focus, automatic exposure control, automatic white balance, dynamic range adjustment, and signal to noise management.

Display 150 may be controlled by the processor circuit 160 so as to display images acquired by sensor 110, as well as to display representations of image quality measurements and composite image quality measurements, as described below with respect to FIGS. 3, 4, and 5. Display 150 may be integrated with a touchscreen and/or keyboard of input device 170. In an embodiment, display 150 is an electronic display.

Input device 170 may include one or more switches, knobs, joysticks, trackballs, touchscreens, and voice controllers. In some aspects, the input device 170 may be a touch screen, mouse, or keyboard. Input device 170 may enable a user to request image acquisition, a change in a control setting of the stage 130, illuminator 140, optics 120, or sensor 110. Input device 170 may enable a user to request a change in an image quality measurement, as described below with respect to FIG. 4.

Memory circuit 180 may include one or more memory circuits to store images, software instructions, or control settings.

Figure 2:
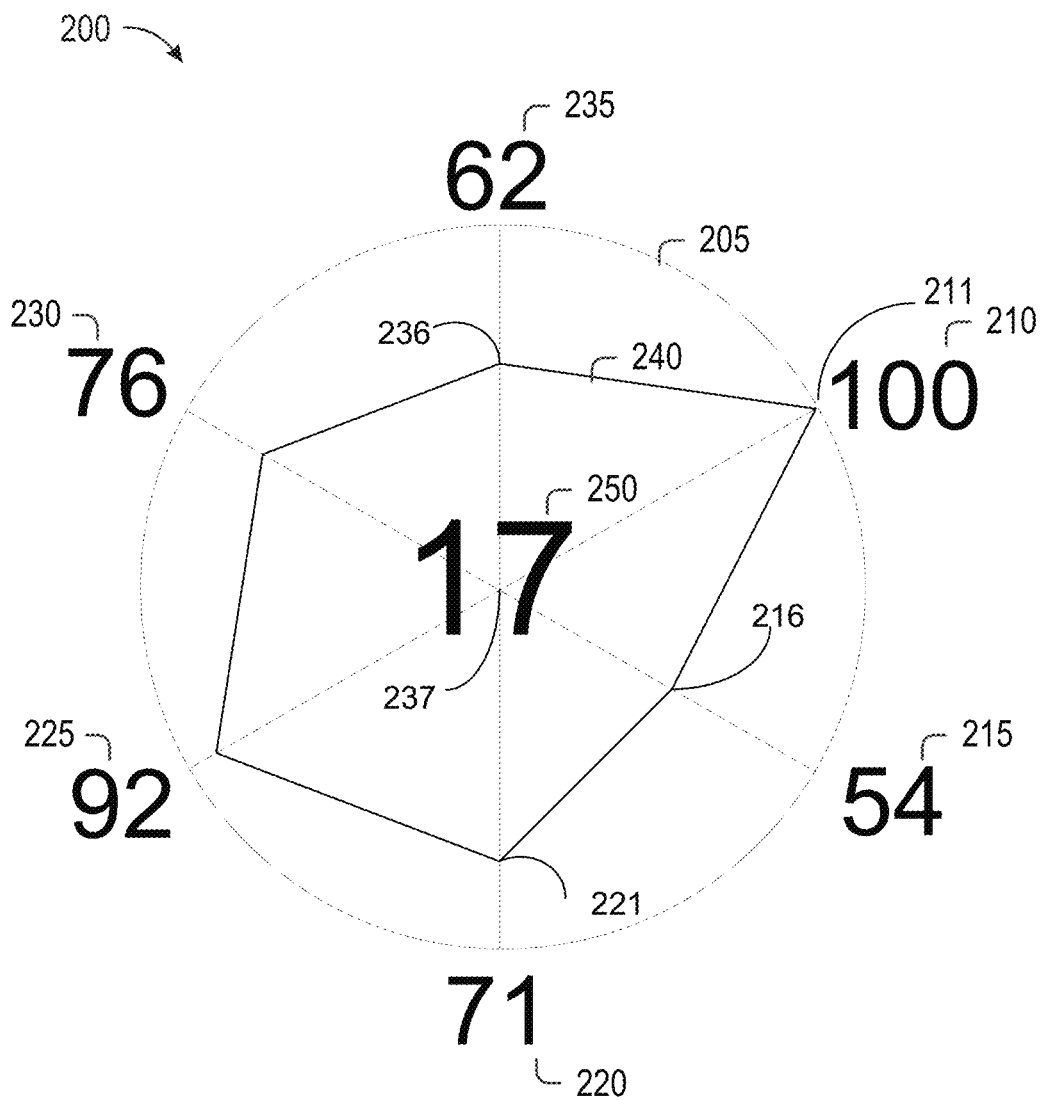
FIG. 2 is a schematic illustration of an image quality star with six image quality measurements and a composite image quality measurement.

FIG. 2 is a schematic illustration of an image quality star 200. In some aspects, the image quality star 200 may be generated by the processor 160 discussed above and displayed on the display 150 of microscopy system 100. Image quality star 200 displays image quality measurements 210, 215, 220, 225, 230, and 235 as well as a composite measure 250. Image quality star 200 also displays a polygon 240.

In this example, image quality measurements 210, 215, 220, 225, 230, and 235 may be measures of sharpness, mean intensity, histogram variance, histogram symmetry, clipping, and signal to noise ratio, respectively, with values of 100, 54, 71, 92, 76, and 62, respectively. In the illustrated aspect, each of these measures is normalized on a 0-100% scale, with higher normalized values corresponding to higher quality measures. These values indicate an in-focus sample with a sharpness value of 100 for image quality measurement 210, and a mean intensity value of 54 for image quality measurement 215. The value of 54 may indicate the image is too bright or too dark for details to be visible. A total image quality composite measure 250 in this illustrated example is calculated according to equation 1, above, for an overall composite value of $TIQ_p$ 17.

Image quality star 200 displays both the six image quality measurements 210, 215, 220, 225, 230, and 235 and the composite measure 215 ($TIQ_p$). Composite measure 250 is based on one or more of image quality measurements 210, 215, 220, 225, 230, and 235.

Polygon 240 is based on a plurality of vertices, each vertex corresponding to an image quality measurement. Only four of the vertices are labeled in FIG. 2 for clarity purposes. These are vertex 211, (corresponding to image quality measurement 210), vertex 216 (corresponding to image quality measurement 215), vertex 221 (corresponding to image quality measurement 220), and vertex 236 (corresponding to image quality measurement 235). The polygon 440 is also based on an origin point 237.

The shape of the polygon 240 is based on a distance of each of the vertices (for example, 211, 216, 221 and 236) from the origin point 237, which in some aspects is proportional to the value of each vertices corresponding image quality measurement (in this example, image quality measurements 210, 215, 220 and 235 respectively).

Each of the vertices are connected by lines (line segments) to form the polygon 240, with a number of lines (sides) corresponding to the number of image quality measurements. In an embodiment, axes between the origin point 237 and each vertices (such as vertexes 211, 216, 221 and 236) may be arranged regularly at constant radial intervals (for example, every 60 degrees if there are 6 image quality measurements as shown, or every 90 degrees if there are four image quality measurements, or every 120 degrees if there are three image quality measurements). In an embodiment, the values of the image quality measurements are displayed outside the frame 205 in proximity to the end of the respective axes.

The composite measure 250 may be displayed in an approximate center of the image quality star 200. When an image quality measurement changes, a distance between a corresponding vertex of that measure and the origin point 237 of the image quality star also changes.

In some aspects, at least a portion of the polygon 240 is filled in with a determined color. In an embodiment, the color is determined based on a value of the composite measure 250. In an embodiment, at least a portion of the image quality star 200, such as the polygon 240 and/or the composite measure 250 is displayed with the determined color. For example, the colors green, yellow, and red may correspond to high, medium, and low composite image quality, as quantified by the composite measure 250.

Image quality star 200 may be generated for a single image captured by sensor 110. The image quality star 200 may be regenerated during a calibration or control setting process. For example a user may adjust a location of a sample by adjusting the stage 130, adjust a pointing angle or focal plane position of optics 120, or adjust a sensor 110 control value. Each of these adjustments may be made with input device 170. As these control values change, additional images may be acquired by sensor 110. The processor circuit 160 may determine image quality measurements and a total image quality composite measure for each additional image, and display an image quality star 200 for each additional image. This iterative display of the image quality star 200 may enable a user to determine how a change in control settings is changing image quality as the changes are made. In some aspects, the image quality star 200 may be displayed next to or on top of each image as it is acquired, so that the user gets a view of the image for the current control values.

Figure 3:
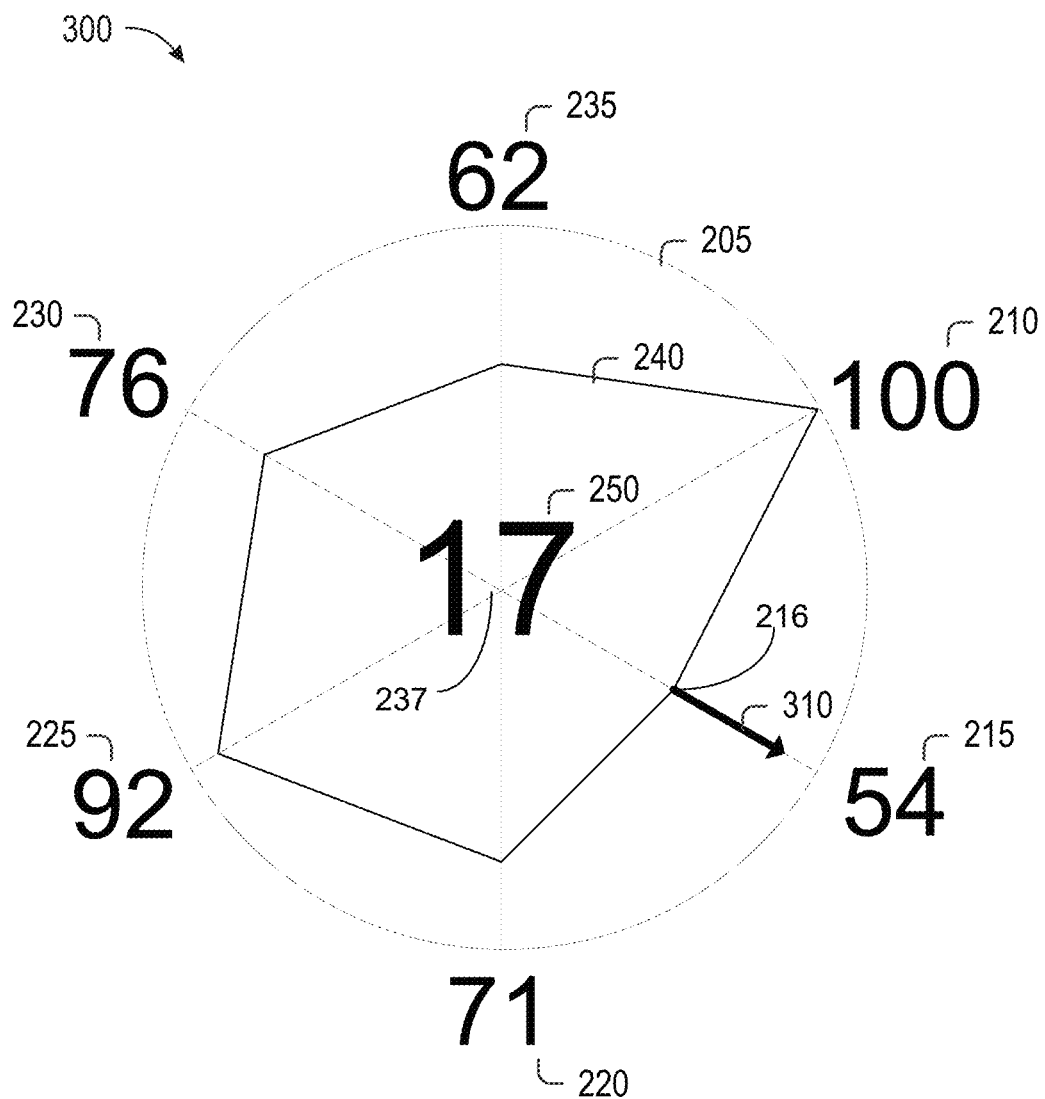
FIG. 3, is a schematic illustration of the image quality star of FIG. 2 further illustrating a user input requesting improvement in one of the image quality measurements.

FIG. 3 is a schematic illustration of the image quality star 300, based on the image quality star 200 of FIG. 2, further illustrating a user input requesting improvement in one of the image quality measurements. In this example, the input 310 increases image quality measurement 215, from a value of 54 to a new value of 88, which is shown in FIG. 4. In some aspects, the input may be made via the input device 170. In an embodiment, the input device 170 is a touch screen that the user uses to drag the vertex 216 from the origin of arrow 310 to the head of arrow 310. The updated value of image quality measurement 215 may be determined by making the new value proportional to a new distance between the origin point 237 and the vertices 216. In an embodiment, the user taps the origin of arrow 310 and the head of arrow 310 to enter the requested change. In an embodiment, the input device 170 is a mouse that the user uses to drag the vertex from the origin of arrow 310 to the head of arrow 310 to enter the requested change. In an embodiment, the input device 170 is one of the other types of input devices described above with regard to FIG. 1. In some aspects, the arrow 310 is not displayed. In some aspects, the arrow 310 is displayed.

In some aspects, after the user enters the requested improvement in image quality measurement 215, the processor circuit 160 may determine a change in one or more microscope (or other imaging device) control parameters to effect the requested change. For example, if image quality measurement 215 corresponds to mean intensity value, a change from 54 to 88 may cause the systems and/or methods disclosed herein to increase a level of illumination (for example, by illuminator 140), open an aperture (such as an aperture of optics 120), reduce a shuttle speed or increase an exposure period of a sensor (such as sensor 110), or increase an analog or digital gain of an image acquired by the sensor (again, such as sensor 110). Once any updated control parameters are determined, in some aspects, the processor circuit 160 may issue control signals to the illuminator 140, optics 120, and/or sensor 110 to change a tunable control measure. In some aspects, after the control parameters are updated based on the change in the measurement 215, another image may be captured based on the updated control parameters.

Figure 4:
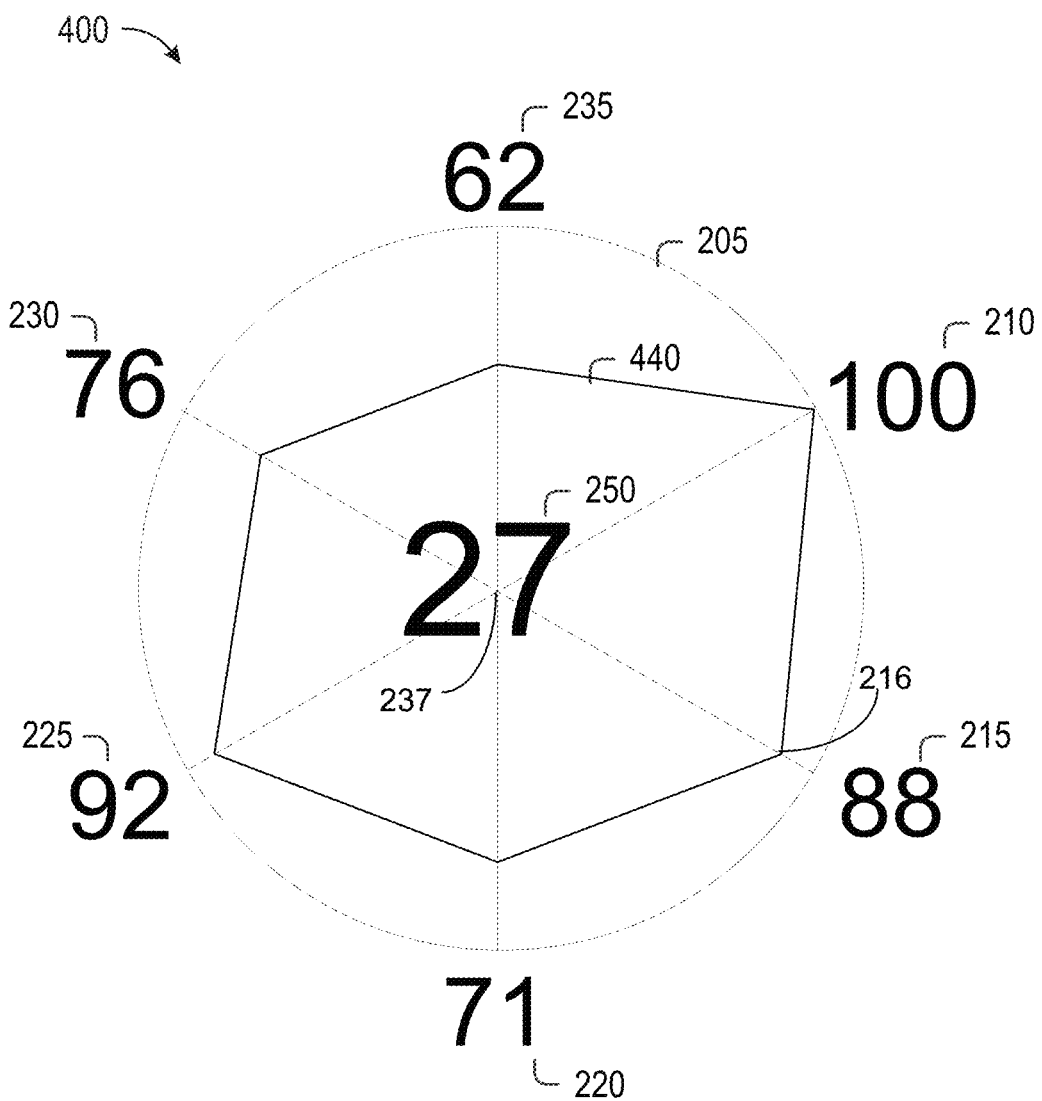
FIG. 4 is an example illustration of an image quality star after the improvement in one of the image quality measurements requested in FIG. 3, for a case in which the other image quality measurements don't change with the improvement.

FIG. 4 is an example illustration of an image quality star 400 after the change in the image quality measurement 215 requested in FIG. 3. FIG. 4 shows that the image quality measurements 210, 220, 225, 230, and 235 did not change when the image quality measurement 215 was changed via request 310 in FIG. 3. Image quality star 400 illustrates the change to 88 of image quality measurement 215. The updated composite image quality value increased from 17 to 27, since it is based in part on the image quality measurement 215. FIG. 4 also illustrates that the position of vertex 216 has changed relative to the position of the vertex 216 of FIG. 3. In some implementations, another image is captured after the change in one or more tunable control measures, in response to the request illustrated by arrow 310.

Figure 5:
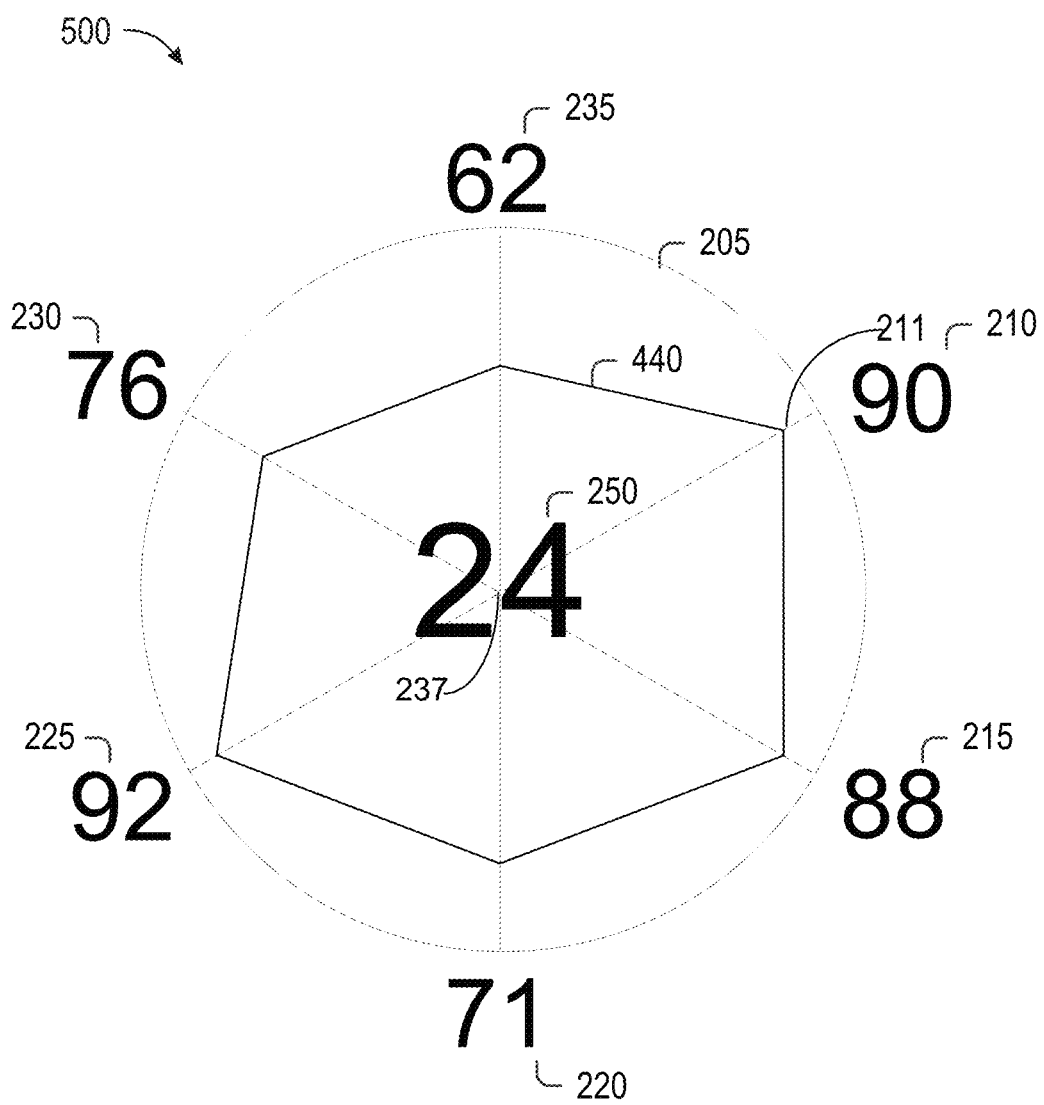
FIG. 5 is another example illustration of an image quality star after the improvement in one of the image quality measurements requested in FIG. 3, for a case in which one of the other image quality measurements does change with the improvement.

FIG. 5 is another example illustration of an image quality star 500 after the change in the image quality measurement 215 requested in FIG. 3. Image quality star 500 shows that along with image quality measurement 215, image quality measurement 210 changes in response to the change in image quality measurement 215, but the image quality measurements 220, 225, 230, 235 do not change. Image quality star 500 illustrates that the change to a setting of 88 for image quality measurement 215 resulted in a decrease in the image quality measurement 210 from 100 to 90. Furthermore, this change is reflected in a change is position of the vertex 211 in FIG. 5, as compared to the position of vertex 211 shown in, for example, FIG. 2 or FIG. 3.

The composite image quality value 250 of FIG. 5 increased from 17 to 24when compared to FIG. 3. Further note the composite image quality value 250 decreased relative to image quality value 250 shown in FIG. 4. This decrease may be due to the decrease in image quality value 210 in FIG. 5 when compared to the embodiment shown in FIG. 4, which did not exhibit the same decrease in image quality measurement 210.

FIG. 5 illustrates the tradeoffs that sometimes occur when adjusting image quality. While FIG. 5 shows that the change 310 of image quality measurement 215 affects image quality measurement 210, additional image quality measurements may also be affected by the change 310, such as image quality measurement 210 as shown in FIG. 5. In some aspects, one or more of image quality measurements 220, 225, 230, 235 may also change in response to the change 310 of FIG. 3.

Figure 6:
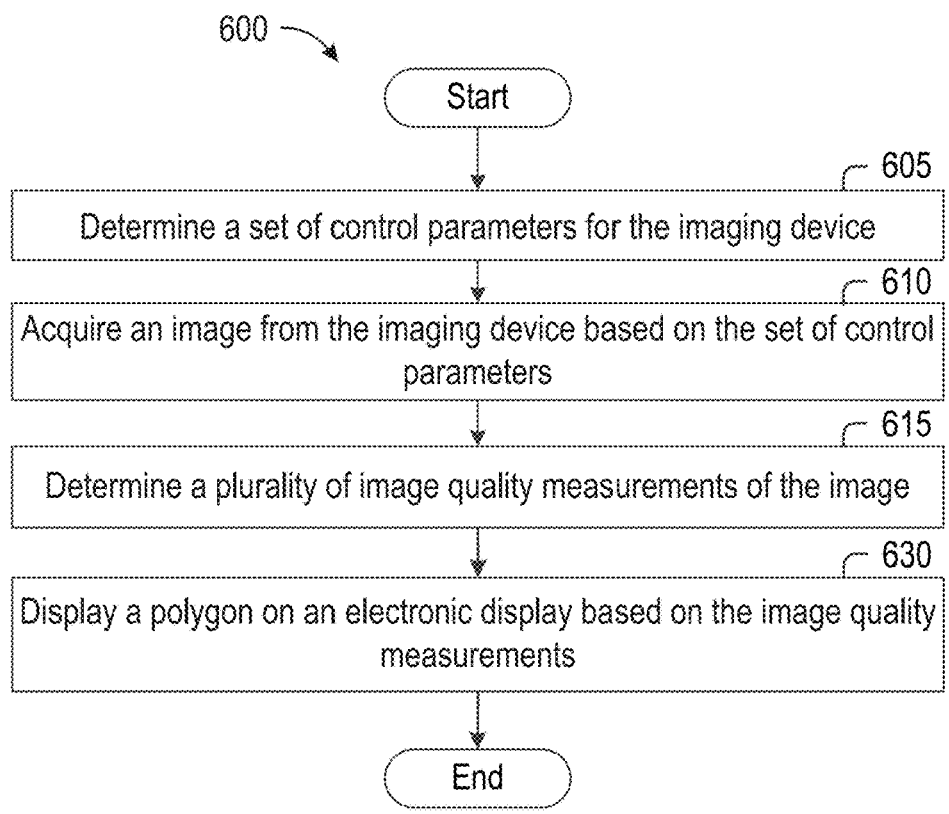
FIG. 6 is a flowchart illustrating an example process for displaying parameters of an imaging device according to one or more aspects of this disclosure.

FIG. 6 is a flowchart illustrating an example process 600 for displaying parameters of an imaging device, according to one or more aspects of this disclosure. In some aspects, process 600 may be performed by the microscopy system 100 of FIG. 1. For example, process 600 may be performed by one or more of the processor circuit 160, display 150, input device 170, sensor 110, optics 120, stage 130, illuminator 140, and memory circuit 180. In some aspects, process 600 may be performed by instructions that configure one or more of the processor circuit 160, display 150, input device 170, sensor 110, optics 120, stage 130, illuminator 140, and memory circuit 180. While process 600 is described below in a series of blocks, any of the blocks described below may be optional.

In optional block 605, process 600 determines a set of control parameters for an imaging device. For example, in some aspects, the set of control parameters determined by process 600 may include control parameters for one or more of the components of microscopy system 100, such as one or more of the sensor 110, optics 120, stage 130, and illuminator 140 as described above with reference to FIGS. 1 and 3. In certain embodiments, the set of control parameters comprises at least one of a sample position, a sample orientation, a focal plane position, an optics magnification, an optics pointing angle, an illumination intensity, a shutter speed, a stigmator coil current, a time for taking an image, an aperture opening, a shutter speed, and a dwell time.

In certain embodiments, control parameters for the sensor 110 may include one or more of timing for image acquisition, an aperture opening, and dwell time. In certain embodiments, control parameters for the optics 120 may include one or more of focal plane position, magnification, and pointing angle. In certain embodiments, control parameters for the stage 130 may include one or more of sample position and sample orientation. In certain embodiments, control parameters for the illuminator 140 may include one or more of illumination intensity or other illumination parameters.

In some aspects, the set of control parameters for the imaging device are electronically controllable. In these aspects, the functionality of block 605 may be performed by the processor circuit 160 in communication with one or more of the sensor 110, optics 120, stage 130, and illuminator 140 in FIG. 1. The processor 160 may be configured, in some aspects, to download or otherwise electronically communicate with one or more controllers for the sensor 110, optics 120, stage 130, and illuminator 140. In some aspects, the processor 160 may also be configured to set control parameters for one or more of the components above to the determined parameters.

In other aspects, the set of control parameters may be manually adjusted, for example, by a human operator. In other embodiments, some portion of the set of control parameters may be electronically controlled by process 600 while another portion of the set of control parameters may be set manually by the human operator.

In an embodiment of process 600, the imaging device being controlled comprises a microscope, a charged particle optical instrument, a photon optical instrument, a single beam scanning electron microscope, a dual beam scanning electron microscope, a multi-beam scanning electron microscope, a focused ion beam microscope, a transmission electron microscope, an optical microscope, a telescope, a medical imaging device, a digital camera, or a video camera.

In block 610, process 600 acquires an image from the imaging device, such as a microscope, based on the set of control parameters. For example, light from a sample on stage 130 illuminated by illuminator 140 may be focused and magnified by optics 120 onto sensor 110, described above with reference to FIG. 1, to acquire the image. In an embodiment, the functionality of block 610 may be performed by one or more of the sensor 110, processor 160, optics 120, stage 130, and illuminator 140 in FIG. 1.

In block 615, process 600 determines, by a processor circuit, a plurality of image quality measurements of the acquired image. For example, the functionality of block 615 may be performed by the processor circuit 160 of FIG. 1, which processes the image to determine a plurality of image quality measurements. In an embodiment, determining the plurality of image quality measurements includes determining one or more of a mean intensity value, a histogram variance value, a histogram symmetry value, a clipping value, a sharpness value, a signal to noise ratio, and a stigmation value. Each of these example image quality measurements are described with reference to FIG. 1 above.

In block 630, a polygon is displayed on the electronic display based on the image quality measurements. In some aspects, the composite measure may be displayed within boundaries of the displayed polygon. In some aspects, the shape and/or size of the polygon may be based on one or more of the composite measure and/or the plurality of image quality measurements of the image. In some aspects, the polygon displayed in block 630 may be displayed in substantial conformance to the polygon 240 shown in either FIG. 2 or FIG. 3, or the polygon 440 shown in either FIG. 4 or FIG. 5.

In some aspects of process 600, a composite measure for the image is determined based on the plurality of image quality measurements. In an embodiment, the composite measure comprises a number based on a mathematical composition or a product of the plurality of image quality measurements, according to equation (1) above, with reference to FIG. 1. In an embodiment, the composite measure comprises a weighted linear combination of the plurality of image quality measurements. For example, in some aspects, the composite measure is determined according to equation (2) above. In some aspects, determination of the composite measure may be performed by the processor circuit 160.

In some aspects of process 600, the determined composite measure is displayed on an electronic display. In certain embodiments, display of the composite measure may be performed by one or more of the processor 160 and the display 150 of FIG. 1. In an embodiment, the composite measure may be displayed within the polygon displayed by process 600 in block 630. In some aspects, the display of the composite measure may be in substantial conformance with the embodiments shown in FIG. 3, 4, or 5, with respect to image quality measure 215. In an embodiment, the composite measure may be displayed alongside the polygon displayed by process 600 in block 630.

In some aspects of block 630, process 600 determines a color based on the composite measure. In an embodiment, process 600 displays at least a portion of the polygon based on the determined color. In some aspects, this functionality may be performed by one or more of the processor 160 and the display 150 of FIG. 1.

In some aspects of block 630, an input is received defining a change in one of the image quality measurements. For example, in some aspects, input may be received via input device 170 of FIG. 1, such as from a mouse, touch screen, or keyboard. In these aspects, the polygon may be updated based on the change. For example, the polygon may be updated as described above with respect to FIGS. 2-5.

In some aspects, after the updated image quality measurement is determined based on the input, one or more control parameters for the imaging device may be updated to achieve the defined image quality measurement or at least capture an image with an image quality measurement closer to the input defined by the image quality measurement.

In some aspects, process 600 further includes acquiring a second image using the imaging device based on the updated set of control parameters. For example, processing in process 600 may move from block 630 to block 610, where a second image is acquired, and processing continues on the second image as described above with respect to the (first) image. Furthermore, in some aspects, process 600 may operate continuously, repetitively, or iteratively, including acquisition of a plurality of images, and optional reception of input defining a change to one or more image quality measurements as described above, determination of a plurality of corresponding control parameters which may be optionally downloaded or otherwise used to electronically set control parameters for the imaging device described above.

Figure 7:
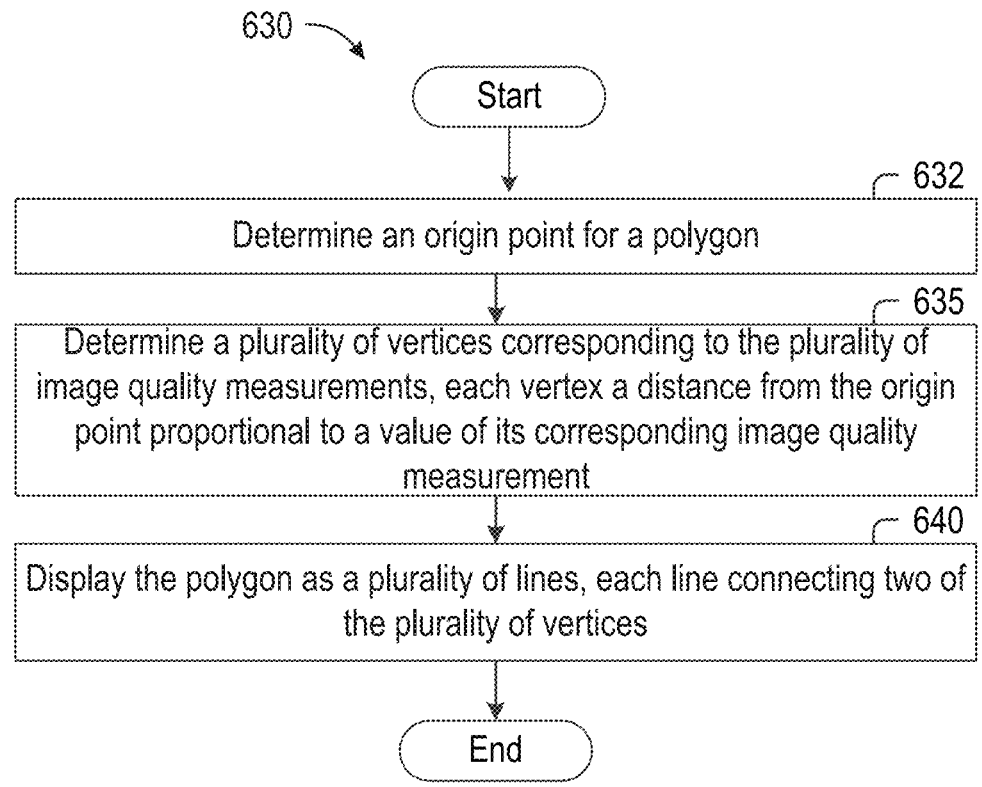
FIG. 7 is a flowchart illustrating an example process for displaying a polygon according to one or more aspects of this disclosure.

FIG. 7 is a flowchart illustrating an example process 630 for displaying a polygon according to one or more aspects of this disclosure. In some aspects, process 630 of FIG. 7 may be equivalent to block 630 of FIG. 6 discussed above, and may be performed, in some aspects, by one or more of the processor 160 and display 150.

Block 632 determines an origin point for a polygon. In an embodiment, the origin point corresponds to a point at the center of an image quality star, such as any of the image quality stars 200, 300, 400, 500 of FIGS. 2, 3, 4, 5 respectively. In some aspects, the functionality of block 632 may be performed by the processor circuit 160 of FIG. 1.

Block 635 determines a plurality of vertices corresponding to a plurality of image quality measurements. In some aspects, the plurality of image quality measurements are the plurality of image quality measurements discussed above with respect to FIG. 6. A position of each vertex is a distance from the origin point that is proportional to a value of its corresponding image quality measurement. In some aspects, the plurality of vertices described with respect to block 635 may correspond to the vertices of polygon 240 shown in either FIG. 2 or FIG. 3, or the vertices of polygon 440 as shown in either FIG. 4 or FIG. 5. Some aspects of block 635 normalize the plurality of image quality measurements between common first and second values, such as 0 to 1 or 0 to 100%. The position of each vertex may then be determined in these embodiments to be a distance proportional to the normalized value. In some aspects, one or more of the functions discussed above with respect to block 635 may be performed by the processor circuit 160 of FIG. 1.

Block 640 displays the polygon on the electronic display. The polygon is displayed as a plurality of lines, each line connecting two of the plurality of vertices. In some aspects, the polygon displayed in block 640 may appear substantially similar, or be displayed according to the methods described above with respect to the polygon 240 in either FIG. 2 or FIG. 3, or the polygon 440 as shown in either FIG. 4 or FIG. 5.

In some aspects, the polygon displayed in block 640 may include fewer, the same, or more vertices than either the polygon 240 or the polygon 440. In some aspects, of block 640, one or more values of image quality measurements are displayed within a proximity of a vertices corresponding to each of the one or more image quality measurements. For example, as shown in FIG. 5, the image quality measurement 210 is displayed.

Some aspects of block 640 further include receiving an input via an input device, the input defining a change to at least one of the image quality measurements. In some aspects, the displayed polygon is updated based on the input. In some aspects process 630 receives an input via the input device 170 and processor circuit 160 of FIG. 1.

As discussed above with respect to the example of FIG. 3, an input may be provided that defines an updated value for one or more displayed image quality measurements, such as image quality measurements 210, 215, 220, 225, 230, and 235 shown in FIG. 3. In some aspects, the input may define an updated value to an image quality measurement by indicating a modified distance between the origin point and a vertices corresponding to the image quality measurement being updated. For example, the input may define a "drag" operation, the moves the vertices either closer or further away from the origin point. In some other aspects, the input may indicate a keyed value for the image quality measurement. For example, an input may define a numerical value of the updated image quality measurement.

Based on the changed image quality measurement, one or more updates to other image quality measurements may be determined, for example, as shown with respect to the discussion above regarding FIG. 5 and image quality measurement 210. In some aspects, a change in at least one of the focal plane position, the sample position, or the sample orientation may be determined in response to a change in the sharpness value. For some implementations, a change in at least one of the aperture opening, the illumination intensity level, or the shutter speed, may be made in response to a change in the mean intensity value or the clipping value. For some implementations, a change in a stigmator coil current may be made in response to a change in the stigmation value. For some implementations a change in the dwell time may be made in response to a change in the signal to noise ratio. Additionally, an update to the composite image quality metric 250 may be determined as discussed above with respect to FIGS. 2-5 in response to any one or more of these changes. These updated values may be displayed on the electronic display 150.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner.

Also, unless stated otherwise a set of elements may comprise one or more elements. In addition, terminology of the form "at least one of: A, B, or C" used in the description or the claims means "A or B or C or any combination of these elements." As an example, "at least one of: a, b, or c" is intended to cover: a, b, c, a-b, a-c, b-c, and a-b-c.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the operations, such as various hardware and/or software component(s), circuits, and/or module(s). Generally, any operations illustrated in the figures may be performed by corresponding functional means capable of performing the operations.

The various illustrative logical blocks, modules and circuits described in connection with the present disclosure may be implemented or performed with a general purpose processor, a graphics processor unit (GPU), a digital signal processor (DSP), an application specific integrated circuit (ASIC), a field programmable gate array (FPGA) or other programmable logic device (PLD), discrete gate or transistor logic, discrete hardware components or any combination thereof designed to perform the functions described herein.

The systems and methods described herein may be implemented on a variety of different computing devices. They may use general purpose or special purpose computing system environments or configurations. Examples of computing systems, environments, and/or configurations that may be suitable for use with the invention include, but are not limited to, personal computers, server computers, handheld or laptop devices, multiprocessor systems, microprocessor-based systems, programmable consumer electronics, network PCs, minicomputers, mainframe computers, distributed computing environments that include any of the above systems or devices, and the like.

A general purpose processor or processor circuit may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer.

By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-Ray® disc where disks usually reproduce data magnetically, while discs reproduce data optically with lasers.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims. The functions described may be implemented in hardware, software, firmware or any combination thereof. If implemented in software, the functions may be stored as one or more instructions on a computer-readable medium.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
   receiving a first image from an imaging device obtained based on a first set of image capture control parameters;
   determining, by processing the first image using a processor circuit, a plurality of image quality measurements of the first image and, based on the plurality of image quality measurements, a composite measure of image quality;
   displaying a polygon on an electronic display based on the plurality of image quality measurements,
   wherein displaying the polygon comprises:
      determining an origin point for the polygon;
      determining a plurality of vertices corresponding to the plurality of image quality measurements, each vertex a distance from the origin point proportional to a value of its corresponding image quality measurement; and
      displaying the polygon as a plurality of lines, each line connecting two of the plurality of vertices;
   displaying the composite measure of image quality based on the image quality measurements associated with the vertices corresponding to the plurality of image quality measurements;
   determining a second set of image capture control parameters for the imaging device based on the composite measure of image quality; and
   transmitting at least one of the second set of image capture control parameters for capture of a second image by the imaging device.

2. The method of claim 1, further comprising displaying the values of the plurality of image quality measurements of the first image along corresponding axes between the origin point and corresponding vertices.

3. The method of claim 1, further comprising acquiring the second image from the imaging device based on the second set of image capture control parameters.

4. The method of claim 3, wherein the second set of image capture control parameters includes at least one of a stigmator coil current and a dwell time.

5. The method of claim 1, wherein the imaging device is an electron microscope or an ion beam microscope.

6. The method of claim 3, wherein determining the second set of image capture control parameters comprises at least one of:
   determining a change in at least one of a focal plane position, a sample position, or a sample orientation in response to a change in a sharpness value,
   determining a change in at least one of an aperture opening, an illumination intensity level, or a shutter speed, in response to a change in a mean intensity value or a clipping value,
   determining a change in a stigmator coil current in response to a change in a stigmation value, and
   determining a change in a dwell time in response to a change in a signal to noise ratio.

7. An apparatus for controlling an image capture device, the apparatus comprising:
   an electronic hardware processor;
   an electronic hardware memory, operably coupled to the electronic hardware processor, and storing instructions that when executed, cause the electronic hardware processor to:
      acquire an image via the image capture device based on a first set of image capture control parameters;
      determine a plurality of image quality measurements of the image;
      display a polygon on an electronic display based on the plurality of image quality measurements by:
         determining an origin point for the polygon; and
         determining a plurality of vertices corresponding to the plurality of image quality measurements, each vertex a distance from the origin point proportional to a value of a corresponding image quality measurement, wherein the polygon is displayed as a plurality of lines, each line connecting two of the plurality of vertices;
      based on the determined plurality of image quality measurements associated with the vertices, determine a composite measure of image quality;
      display a value associated with the composite measure of image quality on the electronic display; and
      determine a second set of image capture control parameters for the image capture device based on the composite measure of image quality.

8. The apparatus of claim 7, wherein the electronic memory stores further instructions that when executed, cause the electronic hardware processor to display one or more values of the image quality measurements along corresponding axes between the origin and corresponding vertices.

9. The apparatus of claim 7, wherein the electronic memory stores further instructions that when executed, cause transmission to the image capture device of at least one of the second set of image capture control parameters and cause the electronic hardware processor to acquire a second image with the image capture device based on the at least one of the second set of image capture control parameters.

10. The apparatus of claim 7, wherein the electronic hardware processor is configured to determine the second set of image capture control parameters by at least one of:
   determining a change in at least one of a focal plane position, a sample position, or a sample orientation in response to a change in a sharpness value;
   determining a change in at least one of an aperture opening, an illumination intensity level, or a shutter speed, in response to a change in a mean intensity value or a clipping value;
   determining a change in a stigmator coil current in response to a change in a stigmation value; and
   determining a change in a dwell time in response to a change in a signal to noise ratio.

11. A non-transitory computer-readable storage medium having stored thereon instructions that, when executed, cause an electronic hardware processor of an image capture device to:
   acquire an image based on a set of image capture control parameters;
   determine a plurality of image quality measurements of the image;
   determine a composite measure of image quality based on a combination of the image quality measurements of the plurality of image quality measurements;
   display a polygon on an electronic display based on the plurality of image quality measurements by determining an origin point for the polygon and a plurality of vertices corresponding to the plurality of image quality measurements, each vertex a distance from the origin point proportional to a value of a corresponding image quality measurement, wherein the polygon is displayed as a plurality of lines, each line connecting two of the plurality of vertices;
   display a value corresponding to the composite measure of image quality within the polygon;
   determine an updated set of image capture control parameters for the image capture device based on the composite measure of image quality;
   transmit to the image capture device at least one of the second set of image capture control parameters for capture of a second image; and
   acquire a second image from the image capture device based on the updated set of the image capture control parameters.

12. The apparatus of 7, wherein the image capture device is an electron beam microscope or an ion beam microscope, and at least the second set of image capture control parameters determined by the electronic hardware processor includes at least one of a stigmator coil current and a dwell time.

13. The apparatus of 7, wherein the image capture device is an electron beam microscope or an ion beam microscope, and at least the second set of image capture control parameters determined by the electronic hardware processor includes a stigmator coil current.

14. The apparatus of 12, wherein the image capture device is an electron beam microscope or an ion beam microscope, and the first and second sets of image capture control parameters determined by the electronic hardware processor include at least one of a stigmator coil current and a dwell time.

15. The apparatus of 7, wherein the image capture device is a scanning microscope, and at least the second set of image capture control parameters determined by the electronic hardware processor includes a dwell time.

16. The method of claim 1, wherein the imaging device is a scanning microscope.

17. The method of claim 1, further comprising normalizing each of the image quality measurements of the plurality of image quality measurements, wherein the value of the composite measure of image quality is based on the normalized image quality measurements.

18. The method of claim 17, wherein the composite measure of image quality is a product of the normalized image quality measurements.

19. The method of claim 1, wherein the composite measure of image quality is a weighted sum of each of the plurality of image quality measurements.

20. The method of claim 1, further comprising:
using an input device to change the distance from the origin point of the vertex associated with at least one image quality measurement; and
in response to the change in the distance, changing one or more of the image capture control parameters of the first set of image capture to establish corresponding image capture control parameters of the second set of image capture control parameters.

21. The method of claim 20, further comprising acquiring a second image based on the second set of image capture control parameters.

22. The method of claim 20, wherein the input device is a touch screen.

23. The method of claim 1, wherein the value associated with the composite measure of image quality is displayed within the polygon.

24. The method of claim 1, further wherein the value associated with the composite measure of image quality is displayed at the origin.

25. The method of claim 24, further comprising displaying at least a portion of an area of the polygon with a color associated with the value of the composite measure of image quality.

26. The apparatus of claim 7, further comprising:
an input device, operable to change the distance from the origin of a vertex in the plurality of vertices;
wherein in response to the change in the distance, the electronic hardware processor changes one or more of the image capture control parameters of the first set of image capture to establish corresponding image capture control parameters of the second set of image capture control parameters.

27. The apparatus of claim 26, wherein the composite measure of image quality is a product of image quality measurement corresponding to the plurality of image quality measurements or a weighted sum of the plurality of image quality measurements.

28. The non-transitory computer-readable storage medium of claim 26, further comprising instructions that, when executed, cause the electronic hardware processor of the image capture device to be operable in response to an input device, to change the distance from the origin of at least one vertex of the plurality of vertices, wherein the change in distance from the origin represents a request to change at least one image capture control parameter.

29. The apparatus claim 7, wherein the electronic memory stores further instructions that when executed, cause the electronic hardware processor to display within the polygon the value associated with the composite measure of image quality.

* * * * *